UNITED STATES PATENT OFFICE.

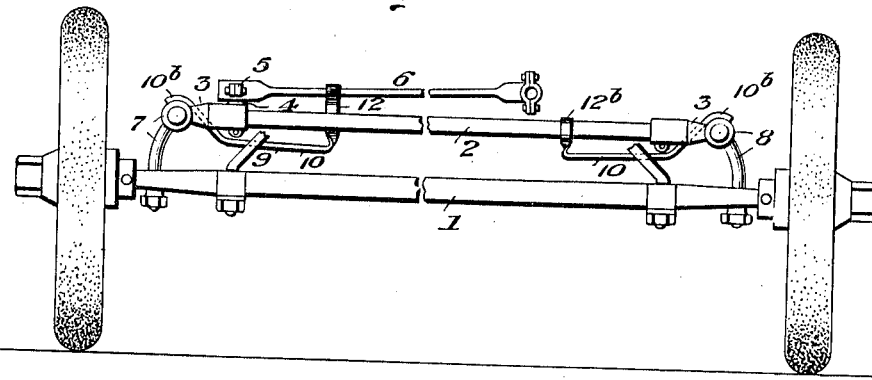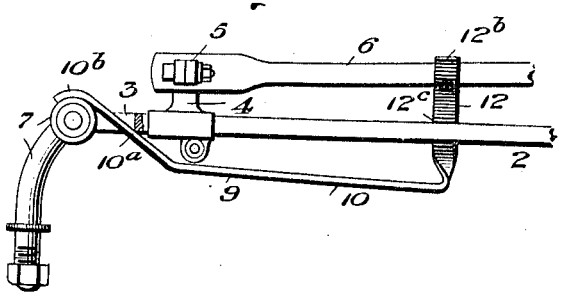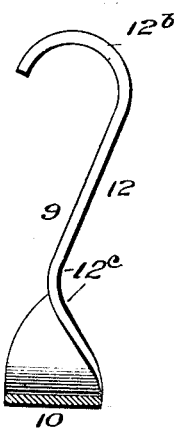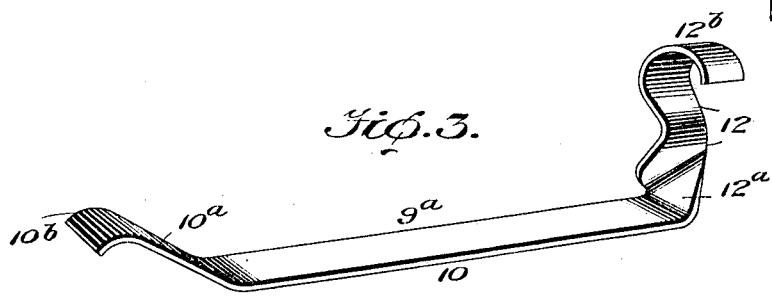

FRANCIS EMMET GRIFFETH, OF ATHENS, GEORGIA.

ANTIRATTLER ATTACHMENT FOR VEHICLES.

1,317,017.   Specification of Letters Patent.   Patented Sept. 23, 1919.

Application filed June 10, 1918, Serial No. 239,232.   Renewed August 4, 1919.   Serial No. 315,283.

*To all whom it may concern:*

Be it known that I, FRANCIS EMMET GRIFFETH, a citizen of the United States, residing at Athens, in the County of Clarke and State of Georgia, have invented certain new and useful Improvements in Antirattler Attachments for Vehicles; and I do hereby declare the following to be a full, clear, and exact description of the invention, such as will enable others skilled in the art to which it appertains to make and use the same.

This invention relates to a resilient plate and a suspending member integral therewith and having a hooked end, adapted to be applied to, and bear at its curved end, against the spindle arm at the forked end of the connecting rod and to engage at its hooked end with the steering rod of a motor vehicle, and is an improvement upon the resilient plate and its connections covered by Patent No. 1,238,135, granted to me August 28, 1917.

The general object of my invention is to maintain the pivotal connection between the connecting rod and the spindle arm in frictional engagement and prevent objectionable noise and rattle of the parts during the running of the vehicle.

A special object is to provide a resilient plate of improved construction, having as an integral part thereof a turned up and twisted suspending member provided with an engaging hook, so as to overcome the cutting effect of a wire link—heretofore used—upon the steering rod and the connecting rod respectively, and also the wear incident to a separate link engaging in a recessed part of a resilient plate where connection is made, as in the construction referred to in my above mentioned patent.

I have discovered in practical use that, while the resilient device and its connecting link, covered by the above mentioned patent, were effective to prevent rattling of parts of the steering mechanism they were open to some objections, and particularly that the separate wire link connections from a recess in the resilient plate has a tendency to cut into the steering rod and the connecting rod respectively and to wear at the recess. To overcome this objection I eliminate the wire link and make the link member an integral part of the resilient plate. This simplifies the construction and assembling of parts and provides a more durable and effective anti-rattler device.

The matter constituting my invention will be defined in the claims.

I will describe the improvement in detail by reference to the accompanying drawing, in which:—

Figure 1, represents a plan view illustrating the invention applied to the chassis of a motor vehicle.

Fig. 2 represents an enlarged detail view of the device, as applied at the left hand side of Fig. 1, to a connecting rod and showing the curved end of the resilient plate bearing against the spindle arm and the hooked retaining member engaging with the steering rod.

Fig. 3 represents a perspective view, on an enlarged scale, of the resilient plate and its integral turned up end in the form in which it is applied to the connecting rod at the right hand side of Fig. 1.

Fig. 4 represents a cross section of the resilient plate with the turned up twisted and lengthened end in elevation in the form used at the left hand side in Fig. 1, being a slight modification of the form shown in Fig. 3.

My improved anti-rattler device is shown applied to the steering mechanism of a motor vehicle commercially known as a Ford automobile, although the device may obviously be used on other types of vehicles with the advantages herein mentioned. Upon the front axle 1 is mounted the connecting rod 2, forked at each end as indicated at 3. Adjacent to one of these forked ends is a spherical member 4, which is engaged by a socket member 5 carried by the steering rod 6.

Pivotally mounted within the forked ends 3 of the connecting rod 2, are the spindle rods 7, 8, of the usual construction.

The important feature of this invention is the improved resilient plate and integral suspending member of particular construction, shown more fully in Figs. 3 and 4. The two plates are substantially the same in construction, but are modified in respect to the turned up suspending member for the two opposite ends of the connecting rod 2, that at the left hand end, Fig. 1, being longer to engage with the steering rod 6, and that at the right hand end being shorter to engage with the connecting rod 2. The differences in construction are shown in Figs. 3 and 4, that shown in Fig. 3 being for the right hand end of the connecting rod. The plates 9, 9ᵃ are preferably made of resilient steel, with a substantially straight body portion 10, having an upwardly inclined portion 10ᵃ, terminating in a curved end 10ᵇ, adapted to bear upon the cylindrical surfaces of the spindle rods 7 and 8, within the forked ends 3 of the connecting rod 2. It will be noted that, while the curved end is seated on the spindle, the inclined portion 10ᵃ bears upward on the rear end of the fork 3.

The turned up end forming the suspending member 12 is given a quarter turn or twist at 12ᵃ and the extremity is curved to form a hooked end 12ᵇ as shown in Figs. 3 and 4. In Fig. 4, the longer suspending member 12 is made with a curved depression 12ᶜ where it bears against, or passes around, the connecting rod 2 to engage by its hooked end 12ᵇ with the steering rod 6. By means of the twist at 12ᵃ the face of the suspending member is brought at right angles transversely to the body portion 10, so that the broad hooked end shall engage the guide rod and the connecting rod, respectively, and prevent cutting into said parts by reason of vibration.

The plates 9, 9ᵃ are mounted substantially parallel with the connecting rod 2, and where applied to the spindle arm 7, the curved end 10ᵇ is seated upon the curved surface of the spindle while the inclined portion 10ᵃ will bear against the inner end of the fork 3. The inner suspension end 12 will pass at its curved portion 12ᶜ around one side of rod 2 and engage by its hooked end 12ᵇ with the guide rod 6 above, thus bringing the resilient body part 10 under tension. In this arrangement the resilient plate 9 continuously bears against the spindle arm 7, and while it permits of the free pivotal movement of the arm, it places the arm in sufficiently frictional engagement with its pivotal bolt as to prevent any objectionable noises, and at the same time prevents working out of the connecting bolt due to looseness and vibration of parts. The resilient plate 9ᵃ is applied to the opposite end of the connecting rod 2, bearing at its curved end 10ᵇ against the pivoted end of the spindle arm 8 to take up any looseness that may occur between the connecting bolt, the spindle arm and the connecting rod. The hooked end 12ᵇ in this instance is engaged directly with the connecting rod 2. The resilient plate 9 may serve also to take up any looseness and prevent objectionable noise in the ball and socket joint connection 4, 5, between the steering rod 6 and the connecting rod 2. This is accomplished by means of the suspending member 12 bearing on the side of rod 2 and engaging with steering rod 6 above.

Various changes may be made in details of construction and arrangement of parts to adapt the invention to other types of vehicles within the scope of the appended claims.

Having described my invention, what I claim and desire to secure by Letters Patent is:—

1. In a motor vehicle, a connecting rod having a forked end, a spindle pivotally mounted in said end, a steering rod mounted adjacent to the connecting rod, a resilient plate having a curved end which is extended between the pivotal end of the spindle on which it bears and the forked end of the connecting rod, and further having a turned up opposite end provided with a hook forming a suspending member, which engages with said steering rod to maintain the plate in a predetermined position and prevent rattle of the connecting parts.

2. In a motor vehicle, the combination with a connecting rod, having a forked end, and a spindle mounted therein, of a resilient plate having an outer inclined portion and a terminal curved end extended between said spindle, on which it bears, and the forked end of said rod, and further having a turned up and twisted end provided with a terminal hook forming a suspending member adapted to engage with a rod to exert pressure at the bearing points on the spindle and forked end of the rod and thus place the resilient plate under tension to prevent rattle of the connecting parts.

3. An anti-rattler attachment for a motor vehicle, consisting of a resilient plate having a substantially straight body portion, an inclined portion terminating in a curved end bearing, and an opposite turned up and twisted rod engaging end having a terminal hook, forming a suspending member.

In testimony whereof, I affix my signature.

FRANCIS EMMET GRIFFETH.

Witnesses:
L. L. MAXWELL,
E. L. BISSON.